(12) United States Patent  
Kobayashi et al.

(10) Patent No.: US 12,252,907 B2  
(45) Date of Patent: Mar. 18, 2025

(54) DOOR CONTROL DEVICE, STORAGE MEDIUM STORING COMPUTER PROGRAM FOR DOOR CONTROL, AND METHOD FOR DOOR CONTROL

(71) Applicant: TOYOTA JIDOSHA KABUSHIKI KAISHA, Toyota (JP)

(72) Inventors: Hiromitsu Kobayashi, Nagoya (JP); Hiromitsu Urano, Numazu (JP); Takefumi Goto, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 18/169,269

(22) Filed: Feb. 15, 2023

(65) Prior Publication Data

US 2023/0295963 A1    Sep. 21, 2023

(30) Foreign Application Priority Data

Mar. 17, 2022 (JP) ................................ 2022-042858

(51) Int. Cl.
| | | |
|---|---|---|
| *E05B 77/02* | (2014.01) | |
| *B60K 35/00* | (2024.01) | |
| *B60K 35/10* | (2024.01) | |
| *H04W 4/90* | (2018.01) | |

(52) U.S. Cl.
CPC .............. *E05B 77/02* (2013.01); *B60K 35/00* (2013.01); *H04W 4/90* (2018.02); *B60K 35/10* (2024.01)

(58) Field of Classification Search
None
See application file for complete search history.

(56) References Cited

U.S. PATENT DOCUMENTS

| | | | |
|---|---|---|---|
| 12,104,422 B1* | 10/2024 | Mapson | E05F 15/646 |
| 2015/0338849 A1* | 11/2015 | Nemec | B60W 50/082 |
| 2020/0385006 A1* | 12/2020 | Matsumoto | B60W 40/08 |
| 2021/0101587 A1* | 4/2021 | Ide | B60W 50/14 |
| 2021/0188325 A1* | 6/2021 | Ogura | B60W 60/00253 |
| 2021/0197762 A1* | 7/2021 | Abiakle Kai | G08G 1/017 |
| 2022/0030408 A1* | 1/2022 | Zhang | H04W 4/90 |
| 2023/0203873 A1* | 6/2023 | Oya | E05F 15/73 49/31 |
| 2023/0272645 A1* | 8/2023 | Sohn | E05B 77/54 70/277 |

FOREIGN PATENT DOCUMENTS

| | | |
|---|---|---|
| JP | 2007-284243 A | 11/2007 |
| JP | 2012-35954 A | 2/2012 |
| JP | 2019-031284 A | 2/2019 |
| JP | 2019-067243 A | 4/2019 |
| JP | 2021-098408 A | 7/2021 |

* cited by examiner

*Primary Examiner* — Aniss Chad  
*Assistant Examiner* — Jennifer M Anda  
(74) *Attorney, Agent, or Firm* — Oliff PLC

(57) ABSTRACT

A door control device has a processor configured to determine whether or not an emergency situation has occurred in a vehicle, based on operation by a user on an operating unit that is to be operated to open a door of the vehicle, and to decide to open the door when it has been determined by the first assessment unit that the emergency situation has occurred.

9 Claims, 6 Drawing Sheets

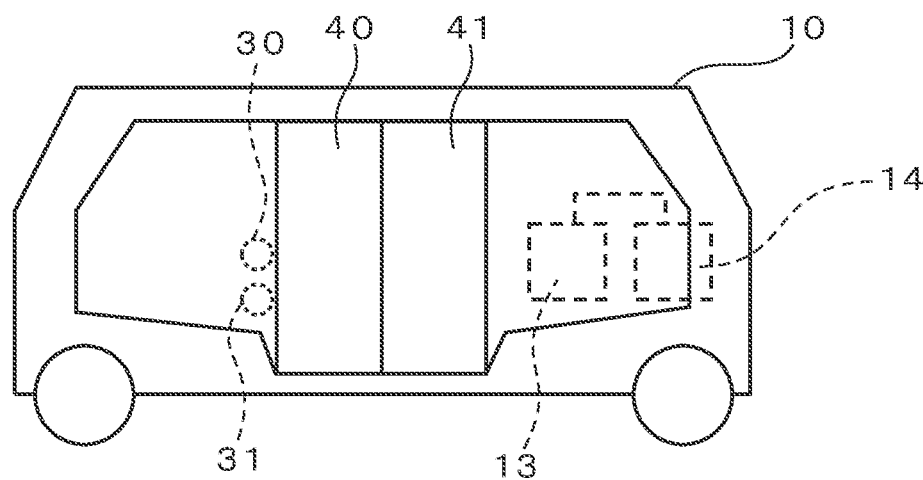
FIG. 1A
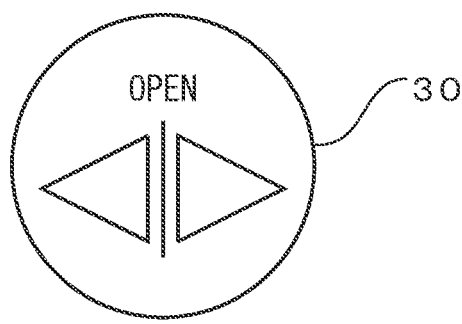
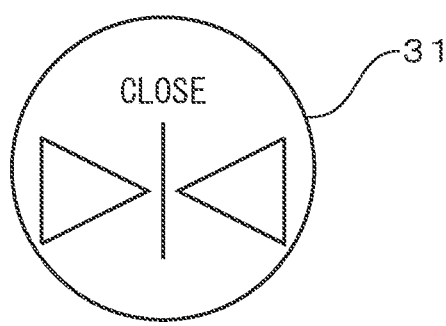
FIG. 1B
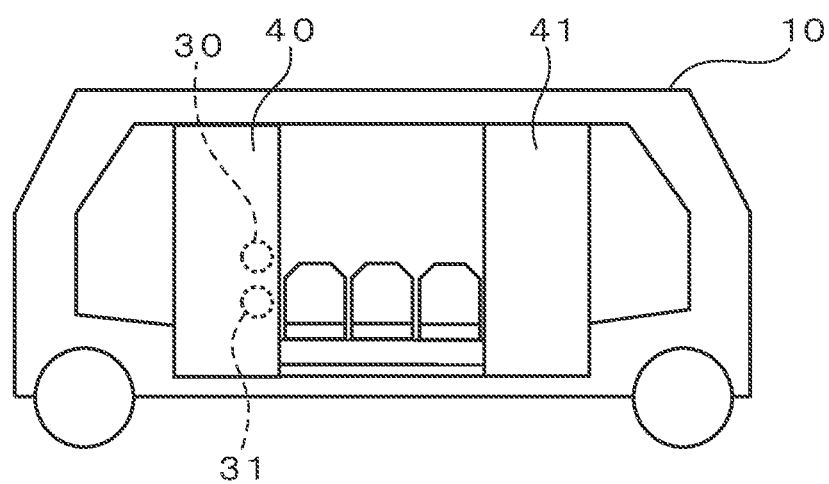
FIG. 1C

DOOR CONTROL DEVICE, STORAGE MEDIUM STORING COMPUTER PROGRAM FOR DOOR CONTROL, AND METHOD FOR DOOR CONTROL

FIELD

The present disclosure relates to a door control device, a storage medium storing a computer program for door control, and a method for door control.

BACKGROUND

Emergency stop buttons have conventionally been mounted in vehicles to stop the vehicles in cases where they are in emergency situations.

For example, when a fire has broken out in a vehicle such as a bus, etc. while the vehicle is traveling, the passengers riding in the vehicle may attempt to open the doors and escape from the vehicle after the vehicle has stopped. In such an event, the passengers operate an emergency stop button provided in the vehicle. When the emergency stop button of a vehicle is operated, the door opens after the vehicle has stopped (see Japanese Unexamined Patent Publication No. 2019-031284, for example). This allows the passengers to escape from the vehicle.

SUMMARY

When an emergency situation has occurred while the vehicle is stopped, the first thought of the passengers is to open the door to escape from the vehicle.

Therefore, the passengers may not readily think of operating the emergency stop button if an emergency situation has occurred while the vehicle is stopped.

Moreover, in some cases, the emergency stop button may not be disposed at a location of the vehicle that allows it to be easily operated by passengers. In an emergency situation, therefore, a passenger may not be able to easily operate the emergency stop button.

It is an object of the present disclosure to provide a door control device that allows the door to be opened and allows passengers to easily escape from the vehicle when an emergency situation has occurred in the vehicle.

One embodiment of the invention provides a door control device. The door control device has a first assessment unit that determines whether or not an emergency situation has occurred in a vehicle, based on operation by a user on an operating unit that is to be operated to open a door of the vehicle; and a deciding unit that decides to open the door when it has been determined by the first assessment unit that the emergency situation has occurred.

In the door control device, the first assessment unit preferably determines that the emergency situation has occurred when the user has carried out a predetermined operation on the operating unit.

In the door control device, the predetermined operation preferably includes at least a predetermined number of operations of the operating unit within a first time period, continuous operation of the operating unit for at least a second time period, or operation of the operating unit with at least a predetermined force.

The door control device preferably has a second assessment unit that determines whether or not the vehicle is stopped, and the deciding unit preferably decides to open the door when it has been determined by the first assessment unit that the emergency situation has occurred and it has been determined by the second assessment unit that the vehicle is stopped.

In the door control device, the deciding unit preferably decides to open the door after the vehicle has been stopped when it has been determined by the first assessment unit that the emergency situation has occurred and it has been determined by the second assessment unit that the vehicle is not stopped, and the door control device preferably has a setting unit that sets a stop location for stopping of the vehicle when the deciding unit has decided to open the door after the vehicle has been stopped.

In the door control device, the first assessment unit preferably determines that the emergency situation has occurred in the vehicle when the operating unit has been operated by the user while the vehicle is traveling.

In the door control device, the first assessment unit preferably sends information indicating that the emergency situation has occurred and information indicating a state of the vehicle to a server via a communication unit, when it has determined that the emergency situation has occurred, and the deciding unit preferably decides to open the door when it has been determined by the first assessment unit that the emergency situation has occurred and assessment results have been received from the server via the communication unit indicating that the emergency situation has occurred in the vehicle.

According to another embodiment, a storage medium storing a computer program for door control is provided. The computer program for door control causes a processor execute a process and the process includes determining whether or not an emergency situation has occurred in a vehicle, based on operation by a user on an operating unit that is to be operated to open a door of the vehicle; and deciding to open the door when it has been determined that the emergency situation has occurred.

Yet another embodiment of the invention provides a method for door control. The method for door control is carried out by a door control device and the process includes determining whether or not an emergency situation has occurred in a vehicle, based on operation by a user on an operating unit that is to be operated to open a door of the vehicle; and deciding to open the door when it has been determined that the emergency situation has occurred.

The door control device of the present disclosure allows the door to be opened and allows passengers to easily escape from the vehicle when an emergency situation has occurred in the vehicle.

BRIEF DESCRIPTION OF DRAWINGS

FIG. 1A is a diagram illustrating operation of the door control device of the embodiment in overview, and showing a vehicle.

FIG. 1B is a diagram illustrating operation of the door control device of the embodiment in overview, and showing an open button and a close button.

FIG. 1C is a diagram illustrating operation of the door control device of the embodiment in overview, and showing a vehicle with the doors open.

DESCRIPTION OF EMBODIMENTS

Figure 2:
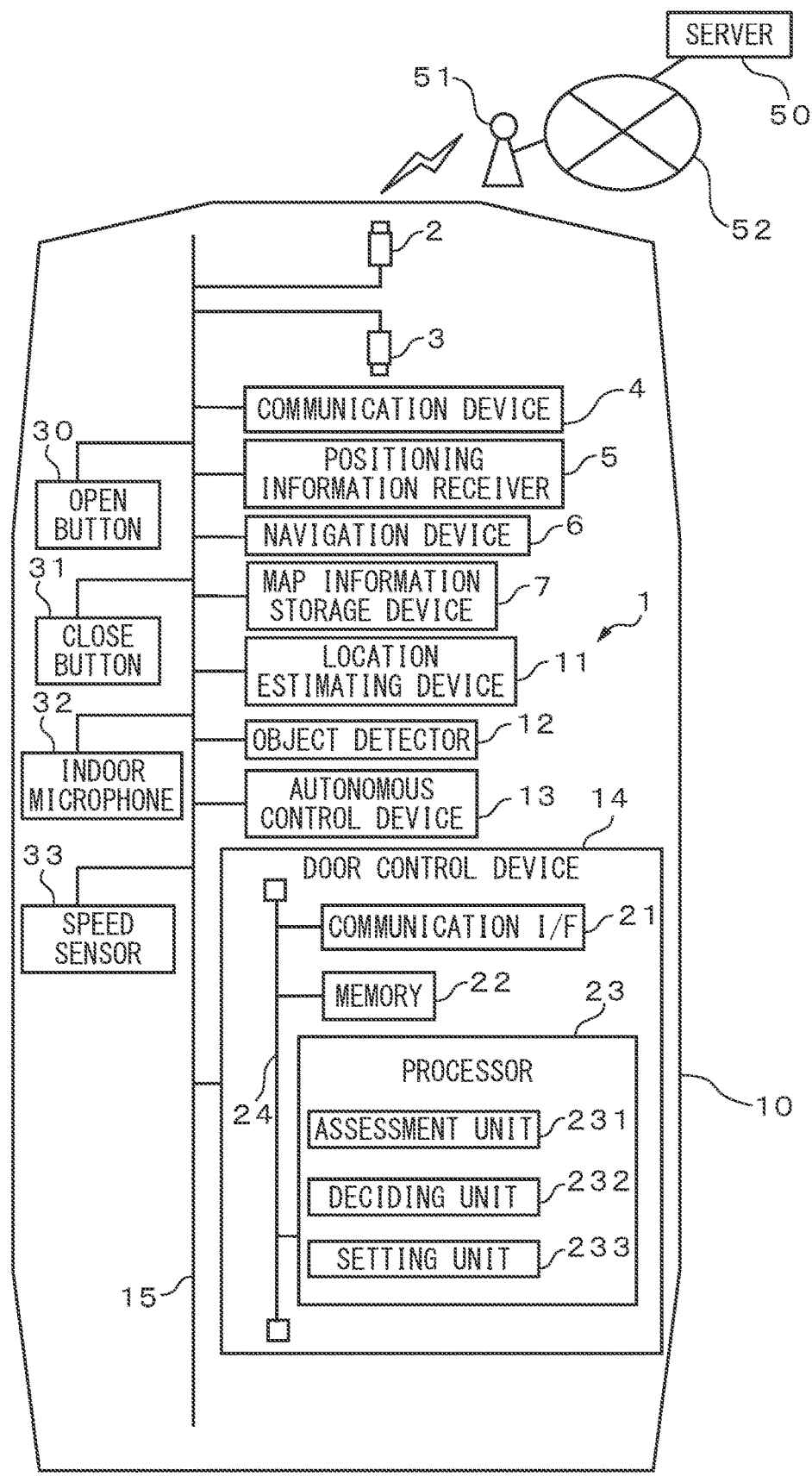
FIG. 2 is a general schematic drawing of a vehicle in which the door control device of the embodiment is mounted.

FIG. 1A to FIG. 1C are diagrams illustrating in overview the door control device 14 of the embodiment. FIG. 1A shows a vehicle 10, FIG. 1B shows an open button 30 and a close button 31, and FIG. 1C shows the vehicle 10 with the doors open.

The vehicle 10 is a schedule bus (a bus on a regular route). The vehicle 10 travels on a driving route which has multiple stop locations. As shown in FIG. 1A, the vehicle 10 has an autonomous control device 13 and a door control device 14. The autonomous control device 13 drives the vehicle 10, causing the vehicle 10 to travel along the driving route. The vehicle 10 may be an autonomous vehicle.

Inside the vehicle 10 are provided an open button 30 that is operated to open the doors 40, 41 and a close button 31 that is operated to close the doors, and which are disposed near the door 40. The open button 30 and close button 31 are preferably disposed at locations allowing them to be easily operated by passengers.

The open button 30 is labeled as "OPEN", and also has a graphic representing the action of opening the doors 40, 41. The close button 31 is labeled as "CLOSE", and also has a graphic representing the action of closing the doors 40, 41. In Japanese, the words are written in hiragana so as to be easily readable by children.

The autonomous control device 13 stops the vehicle 10 at different stop locations. The autonomous control device 13 opens the doors 40, 41 when a passenger (not shown) exiting the vehicle 10 operates the open button 30. The passenger then gets off the vehicle through the opened doors 40, 41. After having opened the doors 40, 41, the autonomous control device 13 closes the doors 40, 41 after a predetermined time period has elapsed.

When an emergency situation has occurred in the vehicle 10, a passenger riding in the vehicle 10 operates the open button 30. The emergency situation may be, for example, a fire in the vehicle 10 or a problem with a passenger, etc.

When a fire has occurred in the vehicle or another passenger in the vehicle has caused a commotion, etc., the passenger may attempt to open the doors 40, 41 to escape from the vehicle. In such an event, the passenger naturally conceives to operate the open button 30 to open the doors 40, 41.

The door control device 14 determines whether or not an emergency situation has occurred in the vehicle 10 based on operation of the open button 30 by the passenger. Specifically, the door control device 14 determines that an emergency situation has occurred when predetermined operation of the open button 30 has been carried out by a passenger. The predetermined operation is preferably an operation that may be naturally made when a passenger attempts to open the doors 40, 41 and escape from the vehicle. For example, the predetermined operation may be continuously pressing the open button 30 for 3 seconds or longer.

The door control device 14 decides to open the doors 40, 41 when it has been determined that an emergency situation has occurred in the vehicle 10. Based on the decision by the door control device 14, the autonomous control device 13 then opens the doors 40, 41, as shown in FIG. 1C. The passenger(s) can then escape from the vehicle through the opened doors 40, 41.

As explained above, the door control device 14 of the embodiment allows the doors 40, 41 to be opened and allows passengers to easily escape from the vehicle when an emergency situation has occurred in the vehicle 10.

FIG. 2 is a general schematic drawing of a vehicle 10 in which the door control device 14 of the embodiment is mounted. The vehicle system 1 has a front camera 2, a monitoring camera 3, a communication device 4, a positioning information receiver 5, a navigation device 6, a map information storage device 7, an open button 30, a close button 31, an indoor microphone 32, a speed sensor 33, a location estimating device 11, an object detector 12, an autonomous control device 13 and a door control device 14, etc. The vehicle 10 may also have a LiDAR sensor, as a distance sensor (not shown) for measurement of the distance of the vehicle 10 to surrounding objects.

The front camera 2, monitoring camera 3, communication device 4, positioning information receiver 5, navigation device 6, map information storage device 7, open button 30, close button 31, indoor microphone 32, speed sensor 33, location estimating device 11, object detector 12, autonomous control device 13 and door control device 14 are connected in a communicable manner through an in-vehicle network 15 that conforms to controller area network standards.

The front camera 2 is mounted inside the compartment of the vehicle 10 and directed toward the front of the vehicle 10. The front camera 2 is an example of a photographing device that photographs front images representing the environment in front of the vehicle 10. The front camera 2 photographs a front image in which a predetermined region ahead of the vehicle 10 is represented, at a front imaging time set with a predetermined cycle. The front image may also show the road on which the vehicle 10 is traveling, road features such as lane marking lines on the road, etc., structures such as stop locations and guard rails, etc., and objects such as other vehicles, etc. Each time a front image is taken, the front camera 2 outputs the front image and front imaging time to the object detector 12 and autonomous control device 13, etc., via the in-vehicle network 15.

The front camera 2 has a 2D detector composed of an array of photoelectric conversion elements with infrared or visible light sensitivity, such as a CCD or C-MOS, etc., and an imaging optical system that forms an image of the photographed region on the 2D detector.

The monitoring camera 3 is disposed in the vehicle compartment in a manner allowing it to photograph monitor images representing the environment of the vehicle 10. The monitoring camera 3 is an example of a photographing device that takes monitor images. The monitor images may include representations of passengers in the vehicle compartment, and equipment in the vehicle compartment including seats and the doors 40, 41, etc. The monitoring camera 3 is preferably disposed inside the compartment in a manner allowing it to photograph the environment in the compartment, including at least the doors 40, 41. For example, the monitoring camera 3 is disposed at the front or rear ceiling of the vehicle 10, in a manner allowing the compartment to be photographed in the lengthwise direction.

The monitoring camera 3 photographs the environment of the compartment at a monitor imaging time with a predetermined cycle. Each time a monitor image is taken, the monitoring camera 3 outputs the monitor image and monitor imaging time to the autonomous control device 13 and door control device 14, etc., via the in-vehicle network 15.

The monitoring camera 3 has a 2D detector composed of an array of photoelectric conversion elements with infrared or visible light sensitivity, such as a CCD or C-MOS, etc., and an imaging optical system that forms an image of the photographed region on the 2D detector.

The communication device 4 is an example of a communication unit, being a device that carries out wireless communication processing conforming to a predetermined wireless communication standard, and for example, it accesses a base station 51 to connect with a server 50 through a communication network 52. The communication device 4 sends and receives information, etc. relating to the vehicle 10, to and from the server 50.

The positioning information receiver 5 outputs positioning information that represents the current location of the vehicle 10. The positioning information receiver 5 may be a GPS receiver, for example. The positioning information receiver 5 outputs positioning information and the positioning information acquisition time at which the positioning information has been acquired, to the navigation device 6, map information storage device 7, autonomous control device 13, etc., each time positioning information is acquired at a predetermined receiving cycle.

Based on the navigation map information, the destination location of the vehicle 10, and positioning information representing the current location of the vehicle 10 input from the positioning information receiver 5, the navigation device 6 creates a navigation route from the current location to the destination location of the vehicle 10. The navigation route includes information relating to the locations of multiple stops. Every time a navigation route is created, the navigation device 6 outputs the navigation route to the location estimating device 11 and the autonomous control device 13, etc., via the in-vehicle network 15.

The map information storage device 7 stores wide-area map information for a relatively wide area (an area of 10 to 30 km$^2$, for example) that includes the current location of the vehicle 10. The map information preferably has high precision map information including three-dimensional information for the road surface, information for the types and locations of structures and road features such as road lane marking lines, etc., information representing the types and locations of structures such as stop locations and guard rails, etc., and the legal speed limit for the road, etc. The map information storage device 7 receives the wide-area map information from the server 50 by wireless communication through a communication device 4 mounted in the vehicle 10, in relation to the current location of the vehicle 10, and stores it in the storage device. Each time positioning information is input from the positioning information receiver 5, the map information storage device 7 refers to the stored wide-area map information and outputs map information for a relatively narrow area including the current location represented by the positioning information (for example, an area of 100 m$^2$ to 10 km$^2$), through the in-vehicle network 15 to the location estimating device 11, the object detector 12 and the autonomous control device 13, etc.

The open button 30 is operated by a passenger, etc. and generates an operation signal indicating for the doors 40, 41 to be opened, which is output to the autonomous control device 13 or door control device 14, etc. via the in-vehicle network 15. The open button 30 is an example of an operating unit to be operated for opening of the doors 40, 41 of the vehicle 10. The open button 30 used may also be a mechanical switch, an electrostatic capacitance-type switch or a pressure-sensitive switch, etc. A pressure-sensitive switch preferably generates an operation signal with variable current or voltage according to the pressure with which the open button 30 is operated. When an operation signal indicating that the doors 40, 41 are to be opened is input, the door control device 14 outputs decision information indicating that the doors 40, 41 are to be opened, to the autonomous control device 13.

The close button 31 is operated by a passenger, etc. and generates an operation signal indicating for the doors 40, 41 to be closed, which is output to the autonomous control device 13 or door control device 14, etc. via the in-vehicle network 15. The close button 31 used may also be a mechanical switch, an electrostatic capacitance-type switch or a pressure-sensitive switch, etc. When an operation signal indicating that the doors 40, 41 are to be closed is input, the door control device 14 outputs decision information indicating that the doors 40, 41 are to be closed, to the autonomous control device 13.

The indoor microphone 32 generates an acoustic signal to produce a sound in the compartment of the vehicle 10, and outputs it to the autonomous control device 13, etc. via the in-vehicle network 15. The indoor microphone 32 also preferably functions as an indoor speaker that outputs an acoustic signal.

The speed sensor 33 generates a speed signal indicating the speed of the vehicle 10, and outputs it to the autonomous control device 13 and door control device 14, etc. via the in-vehicle network 15. The speed sensor 33 used may be one that detects the rotational speed of the tires of the vehicle 10, for example. The autonomous control device 13 and door control device 14 calculate the speed of the vehicle 10 based on the speed signal.

The location estimating device 11 estimates the location of the vehicle 10 at the front imaging time, based on the road features surrounding the vehicle 10 represented in the front image. For example, the location estimating device 11 compares lane marking lines identified in the front image with lane marking lines represented in the map information input from the map information storage device 7, and determines the estimated location and estimated declination of the vehicle 10 at the front imaging time. The location estimating device 11 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the front imaging time, the location estimating device 11 outputs this information to the object detector 12, autonomous control device 13 and door control device 14, etc.

The object detector 12 detects other objects around the vehicle 10 and their types (for example, road features, structures, humans or vehicles) based on the front image. The object detector 12 outputs object detection information which includes information representing the types of other objects that were detected, information indicating their locations, and also information indicating their traveling lanes, to the autonomous control device 13 and door control device 14, etc.

The autonomous control device 13 drives the vehicle 10 so that it travels on the driving route with the multiple stop locations, as mentioned above. The autonomous control device 13 controls operations such as steering, engine actuation, braking, etc. based on the current location of the vehicle 10, the navigation route, the map information and the object detection information, etc. The autonomous control device 13 drives the vehicle 10 so that the vehicle 10 operates within predetermined limits. The predetermined limits may be the limits for acceleration and deceleration.

The autonomous control device 13 stops the vehicle 10 at different stop locations. The autonomous control device 13 preferably actuates an electric parking brake (EPB) (not shown) when the vehicle 10 is stopped at a stop location. When stopping at each stop location, the autonomous control device 13 opens the doors 40, 41 when decision information indicating that the doors 40, 41 are to be opened is input from the door control device 14, and closes the doors 40, 41 when decision information indicating that the doors 40, 41 are to be closed is input from the door control device 14.

When it has been determined based on object detection information that a human is present at a stop location while the vehicle 10 is stopped at the stop location, the autonomous control device 13 opens the doors 40, 41 even without the door control device 14 inputting decision information indicating that the doors 40, 41 are to be opened. After opening the doors 40, 41, the autonomous control device 13 then closes the doors 40, 41 after a predetermined time period has elapsed. The autonomous control device 13 closes the doors 40, 41 when the vehicle 10 is traveling, or in other words, when the vehicle 10 is not stopped.

The autonomous control device 13 may also automatically open and close the doors 40, 41 when the vehicle 10 is stopped at a stop location. Opening and closing of the doors 40, 41 at a stop location is controlled by the autonomous control device 13 and therefore does not require operation of the open button 30 by a passenger.

The autonomous control device 13 may also send the current location of the vehicle 10, monitor images, and acoustic signals for sounds inside the vehicle 10, etc. to the server 50 via the communication device 4, at a monitoring time with a predetermined cycle. The administrator of the server 50 can thereby monitor the driving condition of the vehicle 10.

The door control device 14 carries out assessment processing, decision processing and setting processing. For this purpose, the door control device 14 has a communication interface (IF) 21, a memory 22 and a processor 23. The communication interface 21, memory 22 and processor 23 are connected via signal wires 24. The communication interface 21 has an interface circuit to connect the door control device 14 with the in-vehicle network 15.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the door control device 14 are carried out by functional modules driven by a computer program operating on the processor 23, for example. The processor 23 has an assessment unit 231, a deciding unit 232 and a setting unit 233. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. Operation of the door control device 14 will be described in detail below.

The map information storage device 7, location estimating device 11, object detector 12, autonomous control device 13 and door control device 14 are electronic control units (ECU), for example. For FIG. 2, the map information storage device 7, location estimating device 11, object detector 12, autonomous control device 13 and door control device 14 were explained as separate devices, but all or some of them may be constructed in a single device.

Figure 3:
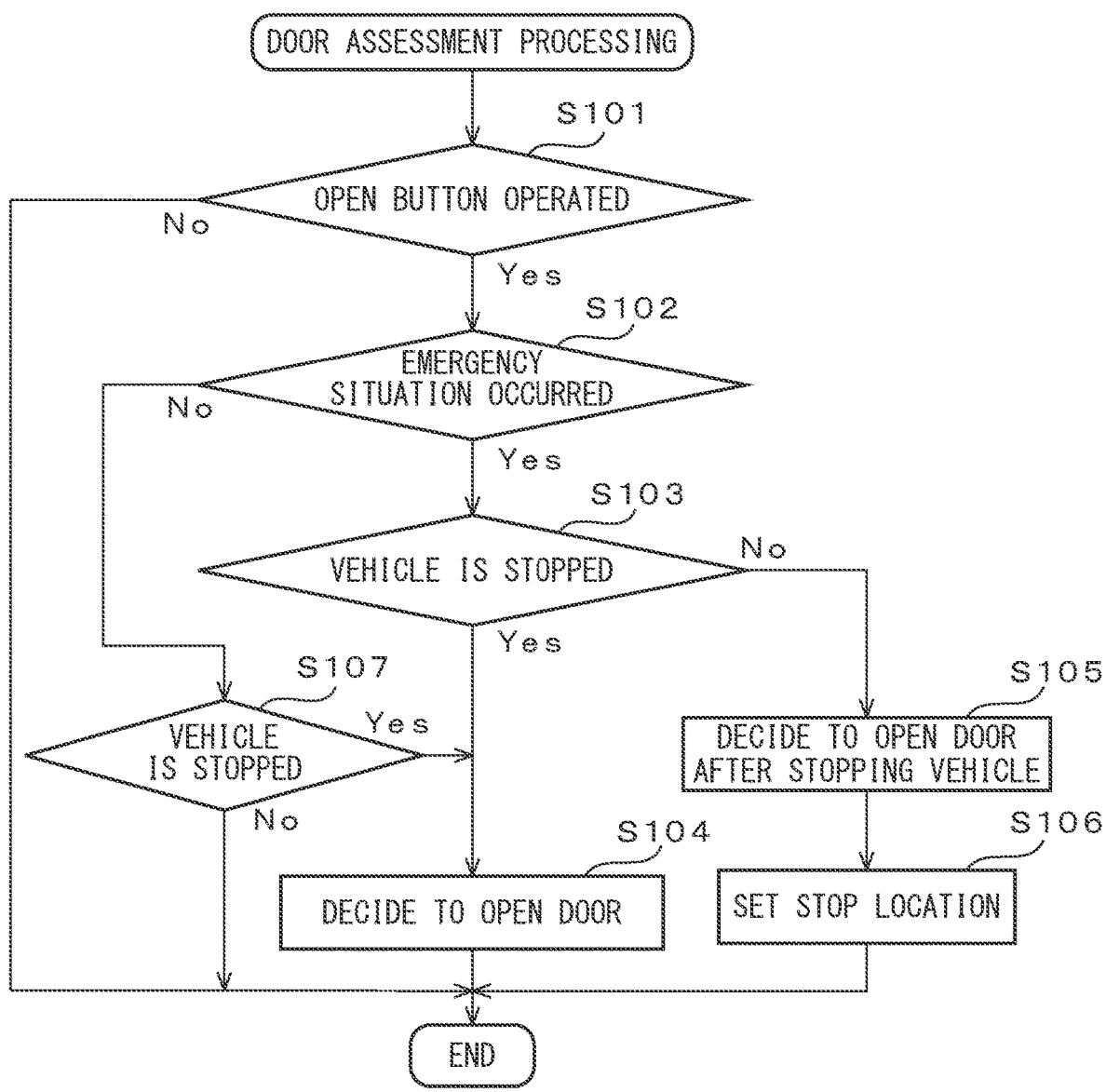
FIG. 3 is an example of an operation flow chart for door assessment processing of a door control device according to the embodiment.

FIG. 3 is an example of an operation flow chart for door assessment processing by a door control device according to the embodiment. Door assessment processing by the door control device 14 will be described below with reference to FIG. 3. The door control device 14 carries out door assessment processing according to the operation flow chart shown in FIG. 3, at a door assessment time having a predetermined cycle.

First, the assessment unit 231 determines whether or not the open button 30 has been operated by a passenger (step S101). The assessment unit 231 is an example of a first assessment unit. When an emergency situation has occurred in the vehicle 10, the passengers riding in the vehicle 10 may open the doors 40, 41 to escape from the vehicle. The emergency situation may be, for example, a fire in the vehicle 10 or a problem with a passenger, etc. An emergency situation may even arise when a passenger fails to exit at the intended stop location. The open button 30 is disposed near the doors 40, 41 and at a location allowing it to be easily operated by passengers, as shown in FIG. 1A, etc. Operation of the open button 30 by a passenger is therefore a natural action by the passenger when an emergency situation has occurred in the vehicle 10. A notification to operate the open button 30 may also be displayed in the vehicle when an emergency situation has occurred in the vehicle 10.

The assessment unit 231 determines that the open button 30 has been operated by a passenger when an operation signal indicating that the doors 40, 41 are to be opened is input (step S101—Yes). On the other hand, the assessment unit 231 determines that the open button 30 has not been operated by a passenger when an operation signal indicating that the doors 40, 41 are to be opened has not been input (step S101—No).

When the open button 30 is operated by a passenger, the assessment unit 231 determines whether or not an emergency situation has occurred in the vehicle 10, based on the operation of the open button 30 by the passenger (step S102). The activity of determining whether or not an emergency situation has occurred in the vehicle 10 by the assessment unit 231 will be described below.

When it has been determined that an emergency situation has occurred in the vehicle 10 (step S102—Yes), the assessment unit 231 determines whether or not the vehicle 10 is stopped (step S103). The assessment unit 231 is an example of a second assessment unit. The assessment unit 231 calculates the speed of the vehicle 10 based on the speed signal input from the speed sensor 33. The assessment unit 231 determines that the vehicle 10 is stopped if the speed of the vehicle 10 is below a predetermined speed reference value. The assessment unit 231 may also determine that the vehicle 10 is stopped when the speed of the vehicle 10 is below the predetermined speed reference value and the electric parking brake is activated.

When it has been determined that the vehicle 10 is stopped (step S103—Yes), the deciding unit 232 decides to open the doors 40, 41 (step S104), and the series of processing steps is complete. The deciding unit 232 outputs decision information indicating that the doors 40, 41 are to be opened to the autonomous control device 13 via the in-vehicle network 15. The autonomous control device 13 receives the decision information and opens the doors 40, 41, as shown in FIG. 1C. The passenger(s) can then escape from the vehicle through the opened doors 40, 41.

When it has been determined that the vehicle 10 is not stopped (step S103—No), on the other hand, the deciding unit 232 decides to open the doors 40, 41 after the vehicle 10 has been stopped (step S105). The deciding unit 232 outputs decision information indicating that the doors 40, 41 are to be opened after the vehicle 10 has stopped, to the autonomous control device 13 via the in-vehicle network 15.

The setting unit 233 then sets a stop location for stopping the vehicle 10 (step S106), and the series of processing steps is complete. Operation whereby the setting unit 233 sets the stop location for stopping the vehicle 10 will be described below.

When the open button 30 has not been operated by a passenger (step S101—No), the series of processing steps is complete.

When it has been determined that an emergency situation has not occurred in the vehicle 10 (step S102—No), the assessment unit 231 determines whether or not the vehicle 10 is stopped (step S107).

When it has been determined that the vehicle 10 is stopped (step S107—Yes), the deciding unit 232 decides to open the doors 40, 41 (step S104), and the series of processing steps is complete. It may be the case that a passenger has operated the open button 30 to exit the vehicle 10. The deciding unit 232 outputs decision information indicating that the doors 40, 41 are to be opened to the autonomous control device 13 via the in-vehicle network 15. The autonomous control device 13 receives the decision information and opens the doors 40, 41, as shown in FIG. 1C. The passenger then gets off the vehicle through the opened doors 40, 41.

When it has been determined that the vehicle 10 is not stopped, on the other hand (step S107—No), the series of processing steps is complete. Since an emergency situation has not occurred in the vehicle 10 even though the open button 30 was operated, operation of the open button 30 by the passenger is ignored.

Operation by the assessment unit 231 to determine whether or not an emergency situation has occurred in the vehicle 10 will now be explained with reference to FIG. 4 to FIG. 6.

Figure 4:
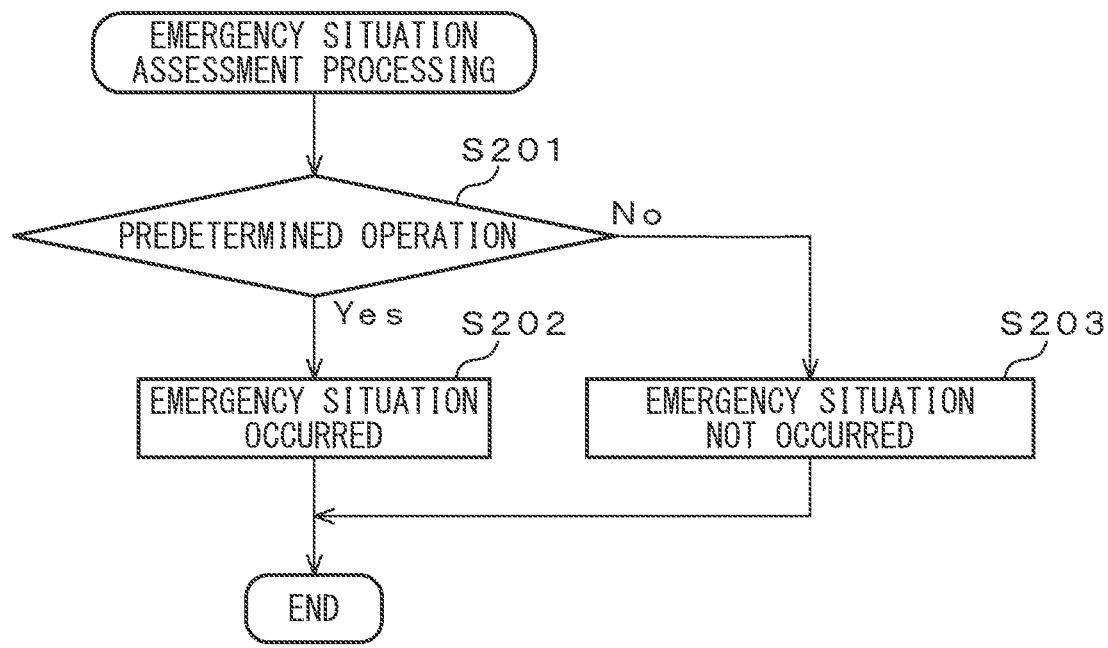
FIG. 4 is a diagram illustrating an example of emergency situation assessment processing.

FIG. 4 is a diagram illustrating an example of emergency situation assessment processing. First, the assessment unit 231 determines whether or not a passenger has carried out a predetermined operation on the open button 30 (step S201). The predetermined operation is preferably an operation that may be naturally made when a passenger attempts to open the doors 40, 41 and escape from the vehicle. For example, the predetermined operation may include operating the open button 30 at least a predetermined number of times (such as 3 times) within a predetermined time (such as 1 second), or continuing to operate the open button 30 for at least a predetermined time period (3 seconds), or operating the open button 30 with at least a predetermined force. When the open button 30 is a pressure-sensitive switch, and the open button 30 has been operated at a pressure of at least the predetermined pressure, the assessment unit 231 determines that a passenger has carried out the predetermined operation on the open button 30. This procedure is only one example, and the predetermined operation may include other operations as well.

When it has been determined that a predetermined operation has been carried out (step S201—Yes), the assessment unit 231 determines that an emergency situation has occurred (step S202), and the series of processing steps is complete.

When it has been determined that a predetermined operation has not been carried out, on the other hand (step S201—No), the assessment unit 231 determines that an emergency situation has not occurred (step S202), and the series of processing steps is complete.

Figure 5:
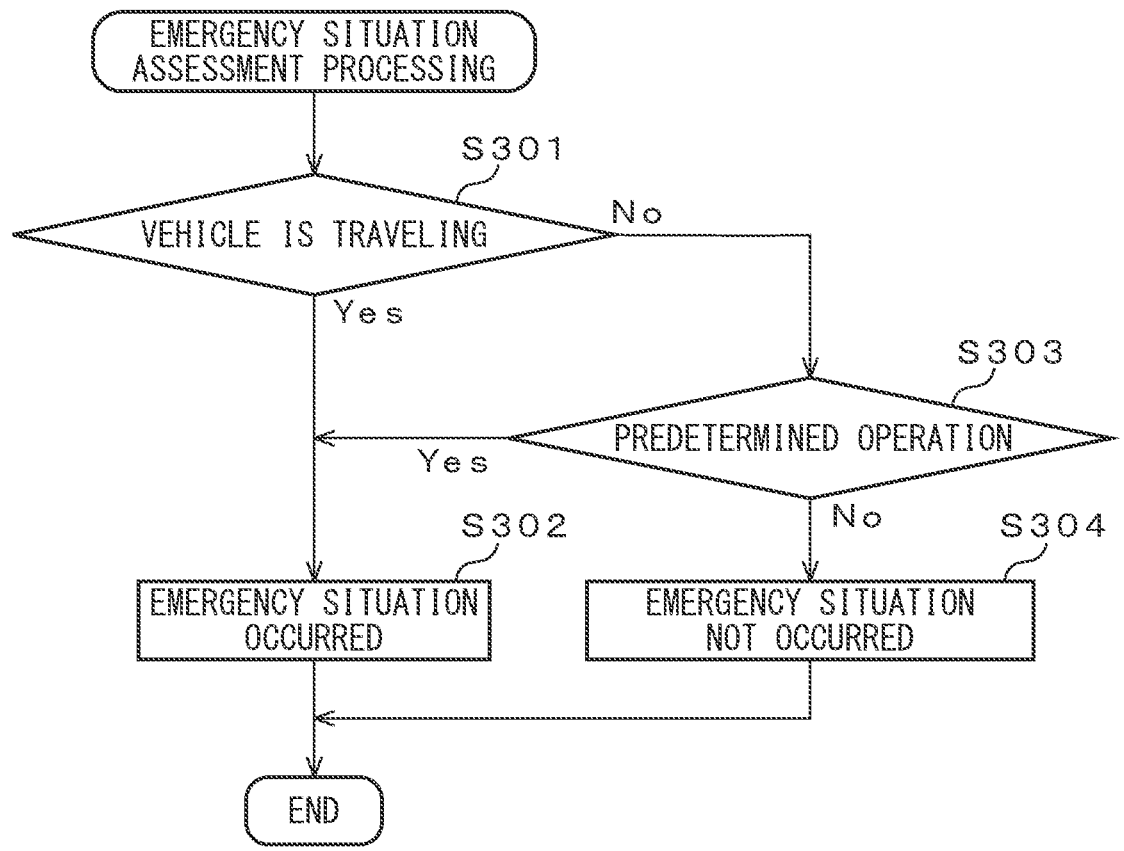
FIG. 5 is a diagram illustrating another example of emergency situation assessment processing.

FIG. 5 is a diagram illustrating another example of emergency situation assessment processing. First, the assessment unit 231 determines whether or not the vehicle 10 is traveling (step S301). The assessment unit 231 calculates the speed of the vehicle 10 based on a speed signal input from the speed sensor 33. The assessment unit 231 determines that the vehicle 10 is traveling if the speed of the vehicle 10 is greater than a predetermined speed reference value (step S301—Yes). On the other hand, the assessment unit 231 determines that the vehicle 10 is not traveling if the speed of the vehicle 10 is at or less than a predetermined speed reference value (step S301—No).

When it has been determined that the vehicle 10 is traveling, the assessment unit 231 determines that an emergency situation has occurred (step S302), and the series of processing steps is complete. If the open button 30 has been operated while the vehicle 10 is traveling (see step S101), then it is assumed that an emergency situation has occurred since it is not a common operation by passengers.

However, if it has been determined that the vehicle 10 is not traveling, the assessment unit 231 determines whether or not a passenger has carried out a predetermined operation on the open button 30 (step S303). When the vehicle 10 is stopped, operation of the open button 30 by a passenger is not necessarily due to an emergency situation occurring in the vehicle 10. The doors 40, 41 are opened and closed by the autonomous control device 13, but the passenger can operate the open button 30 to open the doors 40, 41. The assessment unit 231 therefore determines whether or not a passenger has operated the open button 30 as may occur in the event of an emergency situation.

When it has been determined that a predetermined operation has been carried out (step S303—Yes), the assessment unit 231 determines that an emergency situation has occurred (step S302), and the series of processing steps is complete.

When it has been determined that a predetermined operation has not been carried out, on the other hand (step S303—No), the assessment unit 231 determines that an emergency situation has not occurred (step S304), and the series of processing steps is complete.

Figure 6:
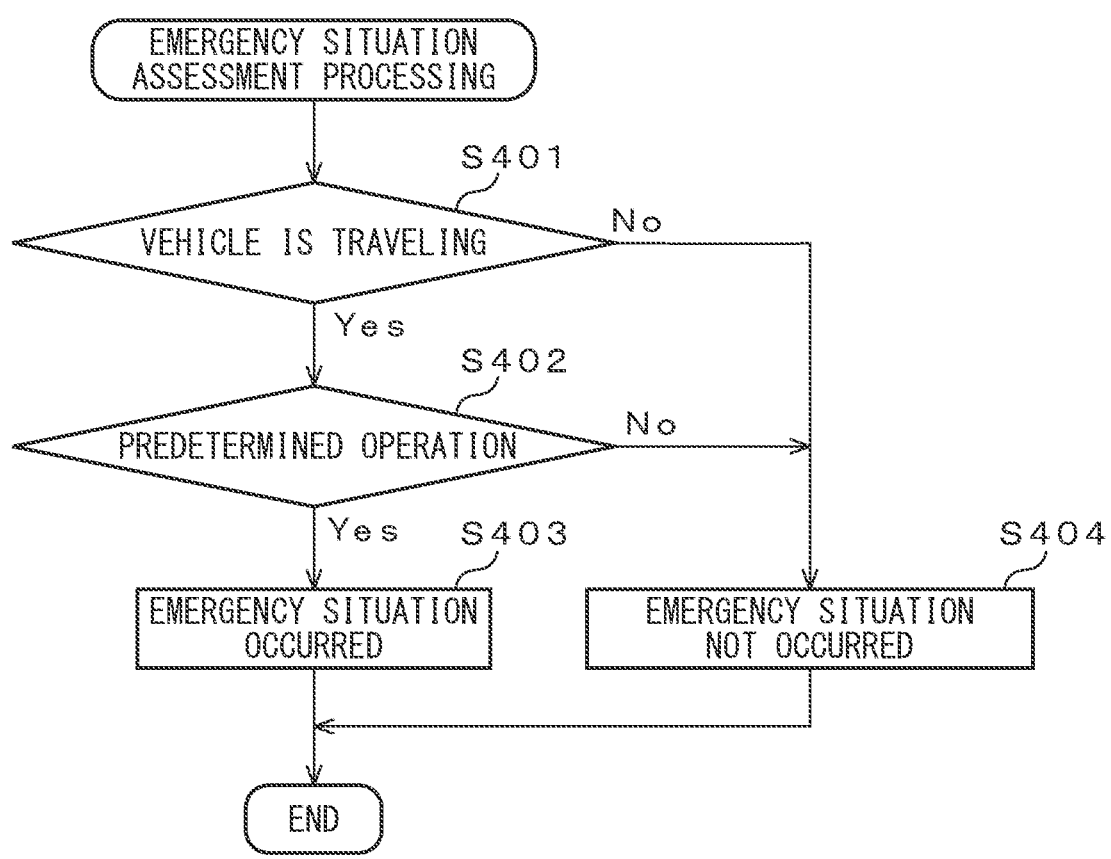
FIG. 6 is a diagram illustrating yet another example of emergency situation assessment processing.

FIG. 6 is a diagram illustrating yet another example of emergency situation assessment processing. First, the assessment unit 231 determines whether or not the vehicle 10 is traveling (step S401). If it has been determined that the vehicle 10 is traveling (step S401—Yes), the assessment unit 231 determines whether or not a passenger has carried out a predetermined operation on the open button 30 (step S402).

When the vehicle 10 is traveling, the passenger may possibly operate the open button 30 accidentally. The assessment unit 231 therefore determines whether or not a passenger has operated the open button 30 as may occur in the event of an emergency situation.

When it has been determined that a predetermined operation has been carried out (step S402—Yes), the assessment unit 231 determines that an emergency situation has occurred (step S403), and the series of processing steps is complete.

However, when it has been determined that the vehicle 10 is not traveling (step S401—No), or when it has been determined that a predetermined operation has not been carried out (step S402—No), the assessment unit 231 determines that an emergency situation has not occurred (step S404), and the series of processing steps is complete.

When it has determined that an emergency situation has occurred in the vehicle 10, the assessment unit 231 may distinguish the degree of the emergency situation as a high degree or a low degree. For example, in the emergency situation assessment processing shown in FIG. 4 to FIG. 6, the assessment unit 231 may determine that the degree of the emergency situation is higher when at least a predetermined number of operations have been carried out on the open button 30 for at least a predetermined time period, and the open button 30 has been operated with at least a predetermined force, compared to when another operation has been carried out on the open button 30.

Operation whereby the setting unit 233 sets the stop location for stopping the vehicle 10 will now be described. The setting unit 233 sets the stop location for stopping the vehicle 10 based on the current location of the vehicle 10 and map information. The setting unit 233 outputs the stop location to the autonomous control device 13 via the in-vehicle network 15. The autonomous control device 13 drives the vehicle 10 so that it stops at the stop location input from the setting unit 233. After the stop location has stopped, the autonomous control device 13 opens the doors 40, 41 as shown in FIG. 1C. The passenger(s) can then escape from the vehicle through the opened doors 40, 41.

When the degree of the emergency situation is high, the autonomous control device 13 may stop the vehicle 10 using a deceleration that exceeds the allowable range for ordinary driving of the vehicle 10. When the degree of the emergency situation is high, the autonomous control device 13 may also drive the vehicle 10 from the current location of the vehicle 10 up to the stop location using an acceleration or speed that exceeds the allowable range for ordinary driving of the vehicle 10.

The setting unit 233 may also set a stop location on the traffic lane adjacent to the shoulder, based on the current location of the vehicle 10 and map information. When the lane in which the vehicle 10 is traveling is not the lane adjacent to the shoulder of the road on which the vehicle 10 is traveling, the vehicle 10 stops at the stop location after having moved to the lane adjacent to the shoulder.

The setting unit 233 may also set a stop location on the shoulder of the road on which the vehicle 10 is traveling, based on the current location of the vehicle 10 and map information. In this case, the vehicle 10 stops at the stop location after having moved from the traveling lane to the shoulder.

The setting unit 233 may also set a stop location based on the current location of the vehicle 10, map information and object detection information. The setting unit 233 may set the stop location to be a location where obstacles such as guard rails or hedges, etc. are absent. The setting unit 233 may also set the stop location to be a registered location, if a previously registered location exists within a predetermined distance from the current location of the vehicle 10. Registered locations include stop locations and emergency parking zones on high-speed roads, for example.

As explained above, the door control device of the embodiment allows the doors to be opened and allows passengers to easily escape from the vehicle when an emergency situation has occurred in the vehicle.

In the door assessment processing represented in FIG. 3, the processing of steps S103, S105 and S106 may be omitted. In this case, when an emergency situation has occurred in the vehicle 10 (step S102—Yes), the deciding unit 232 decides to open the doors 40, 41 (step S104), and the series of processing steps is complete.

Figure 7:
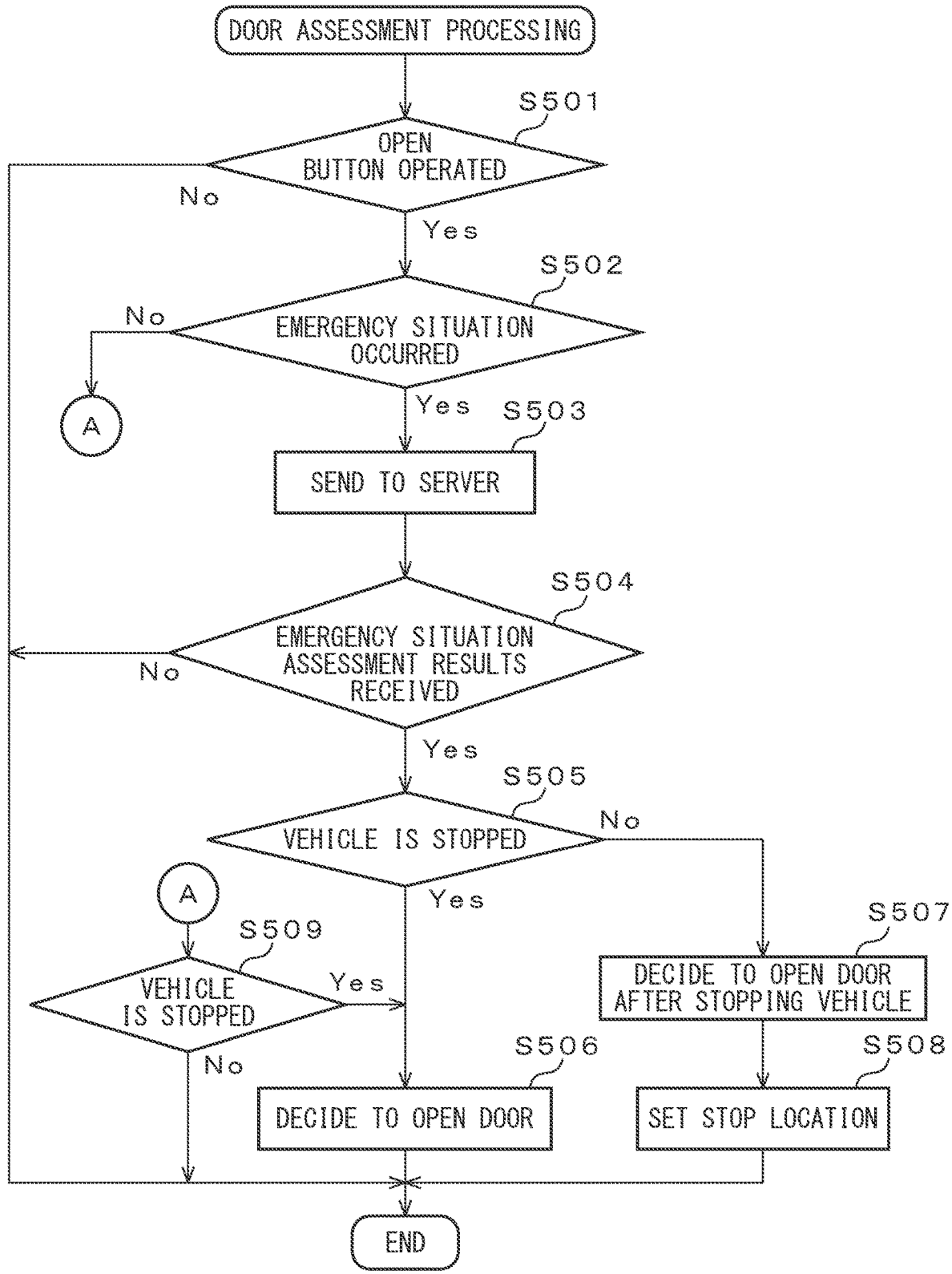
FIG. 7 is a modified example of an operation flow chart for door assessment processing with a door control device according to the embodiment.

A modified example of the door control device of the embodiment will now be described with reference to FIG. 7. FIG. 7 is a modified example of an operation flow chart for door assessment processing of a door control device according to the embodiment.

For the operation flow chart shown in FIG. 7, the processing in steps S503 and S504 have been added to the operation flow chart shown in FIG. 3. The operations in steps S501, S502 and S505 to S509 of FIG. 7 are the same as the operations in steps S101 to S107 of FIG. 3.

When an emergency situation has occurred in the vehicle 10 (step S502—Yes), the assessment unit 231 sends information indicating that an emergency situation has occurred and information indicating the state of the vehicle 10, to the server 50 via the communication device 4 (step S503). The information indicating the state of the vehicle 10 may include the current location of the vehicle 10, monitor images, and acoustic signals that produce sound in the compartment, etc.

The administrator of the server 50 determines whether or not an emergency situation has occurred in the vehicle 10 based on the information indicating the state of the vehicle 10. The administrator of the server 50 confirms the current location of the vehicle 10. When it has been determined that an emergency situation has occurred in the vehicle 10 based on monitor images and sounds produced by regeneration of acoustic signals, the administrator of the server 50 may also send the vehicle 10 assessment results indicating that an emergency situation has occurred in the vehicle 10. For example, when a fire has occurred or when it has been confirmed that a trouble has arisen with a passenger, based on a monitor image, the administrator of the server 50 sends the vehicle 10 the assessment results indicating that an emergency situation has occurred in the vehicle 10, via the server 50. When the administrator of the server 50 has confirmed that a passenger is yelling, based on sounds regenerated from acoustic signals, the administrator sends the vehicle 10 assessment results indicating that an emergency situation has occurred in the vehicle 10, via the server 50.

On the other hand, when the administrator of the server 50 has determined that an emergency situation has not occurred in the vehicle 10 based on monitor images and/or sounds produced by regeneration of acoustic signals, the administrator sends the vehicle 10 assessment results indicating that an emergency situation has not occurred in the vehicle 10.

The administrator of the server 50 may also determine whether or not an emergency situation has occurred in the vehicle 10 based on the monitor image, and based on the number of passengers standing and the number of passengers sitting in their seats. For example, when a passenger is merely standing near the doors 40, 41 while the other passengers are sitting in their seats, it is possible that the passenger standing near the doors 40, 41 has operated the open button 30 unintentionally. In such a case, the administrator of the server 50 may determine whether or not an emergency situation has occurred in the vehicle 10 after having inquired about operation of the open button 30 by the passenger in the vehicle, via the communication device 4 and indoor microphone 32.

When assessment results indicating that an emergency situation has occurred in the vehicle 10 have been received from the server 50 (step S504—Yes), the assessment unit 231 determines whether or not the vehicle 10 is stopped (step S505).

When assessment results indicating that an emergency situation has not occurred in the vehicle 10 have been received from the server 50, on the other hand (step S504—No), the series of processing steps is complete.

If the door control device 14 does not receive assessment results from the server 50 even after elapse of a predetermined time period after having sent information indicating that an emergency situation has occurred and information indicating the state of the vehicle 10 to the server 50, the processing may proceed to step 505.

In the door assessment processing represented in FIG. 7, the processing of steps S505, S507 and S508 may be omitted. In this case, when assessment results have been received from the server 50 indicating that an emergency situation has occurred in the vehicle 10 (step S504—Yes), the deciding unit 232 decides to open the doors 40, 41 (step S506), and the series of processing steps is complete.

As explained above, the door control device for this modified example of the embodiment allows the doors to be opened and allows passengers to easily escape out of the vehicle when an emergency situation has occurred in the vehicle, but only after having further accurately determined that an emergency situation has occurred in the vehicle.

The door control device, the computer program for door control and the method for door control according to the embodiment described above may incorporate appropriate modifications that are still within the gist of the disclosure. Moreover, the technical scope of the disclosure is not limited to these embodiments, and includes the invention and its equivalents as laid out in the Claims.

For example, the vehicle was a schedule bus for this embodiment, but this is not particularly restrictive so long as the vehicle has a door. The vehicle may be a passenger vehicle or a railway vehicle.

In the door assessment processing illustrated in FIG. 3, the assessment unit may determine whether or not an emergency situation has occurred in the vehicle based on both operation of the open button by a passenger and monitor images and/or acoustic signals representing sounds in the compartment. The assessment unit is constructed to include a first classifier that is trained to distinguish between standing passengers and passengers sitting in seats by input of monitor images. The first classifier inputs monitor images, and outputs standing passengers and the locations in the images where the standing passengers appear, as well as sitting passengers and the locations in the images where the sitting passengers appear. The assessment unit has a construction that also includes a second classifier that has been trained to distinguish doors by input of monitor images. The second classifier inputs monitor images and outputs doors and the locations in the images in which the doors appear. Based on the output results from the first classifier and second classifier, the assessment unit estimates that the situation is not an emergency if it has been determined that a passenger is standing near the door and a passenger is sitting in a seat away from the door. This is because it is difficult to imagine that passengers would be sitting in seats if an emergency situation had occurred in the vehicle.

The assessment unit may also determine that an emergency situation has not occurred in the vehicle, even if the open button has been operated by a passenger, if it is estimated that the situation is not an emergency based on monitor images and/or acoustic signals representing sounds in the compartment. Alternatively, the assessment unit may determine that an emergency situation has occurred in a vehicle but that the degree of emergency is low, if the open button has been operated by a passenger but it is estimated that the situation is not an emergency based on monitor images and/or acoustic signals representing sounds in the compartment.

When it has been determined that the vehicle is traveling in the emergency situation assessment processing shown in FIG. 5 or FIG. 6, and the distance between the current location of the vehicle and the next scheduled stop location is no greater than a predetermined distance, and/or the time required for the vehicle to reach the next scheduled stop location is no longer than a predetermined time, it may be determined that an emergency situation has not occurred. This is because a passenger may operate the open button when the vehicle is approaching a stop location but the vehicle is not yet stopped. In such cases it is preferably determined that an emergency situation has not occurred.

The invention claimed is:

1. A vehicle comprising:
    a door configured to open and close;
    an open button for opening the door;
    a speed sensor configured to indicate a speed of the vehicle; and
    a door control device comprising a processor programmed to:
        determine whether or not the open button has been operated by a user;
        determine, in response to determining that the open button has been operated by the user, whether or not an emergency situation has occurred in the vehicle based on predetermined conditions;
        when (i) the open button has been operated by the user, (ii) it is determined that the emergency situation has not occurred, and (iii) a signal output by the speed sensor indicates that the vehicle is stopped, cause the door to open so that the user may exit the vehicle; and
        when (i) the open button has been operated by the user and (ii) it is determined that the emergency situation has occurred, cause the door to open so that the user may exit the vehicle.

2. The vehicle according to claim 1, wherein the predetermined conditions include at least one of a predetermined number of operations of the open button within a first time period, continuous operation of the open button for at least a second time period, and operation of the open button with at least a predetermined force.

3. The vehicle according to claim 1, wherein the processor is further programmed to
    cause the door to open when it has been determined that the emergency situation has occurred and that the vehicle is stopped.

4. The vehicle according to claim 3, wherein the processor is further programmed to
    set a stop location for stopping of the vehicle, when it has been decided to open the door after the vehicle has stopped.

5. The vehicle according to claim 1, wherein the processor is further programmed to determine that the emergency situation has occurred in the vehicle when the vehicle is traveling and the user has carried out an operation on the open button.

6. The vehicle according to claim 1, wherein the processor is further programmed to send information indicating that the emergency situation has occurred and information indicating a state of the vehicle to a server via a communication unit, when it has been determined that the emergency situation has occurred.

7. The vehicle according to claim 1, wherein the processor determines that the emergency situation has occurred if:
 (i) the open button has been operated by the user a plurality of times within a predetermined time period;
 (ii) the open button has been operated continuously by the user for a plurality of seconds; or
 (iii) the open button has been operated with a predetermined force greater than when another operation has been carried out on the open button.

8. A computer-readable, non-transitory storage medium that stores a computer program for controlling a door of a vehicle, the program causing a processor to execute a process comprising:
 determining whether or not an open button of the vehicle for opening the door has been operated by a user;
 determining, in response to determining that the open button has been operated by the user, whether or not an emergency situation has occurred in the vehicle based on predetermined conditions;
 when (i) the open button has been operated by the user, (ii) it is determined that the emergency situation has not occurred, and (iii) a signal output by a speed sensor of the vehicle indicates that the vehicle is stopped, causing the door to open so that the user may exit the vehicle; and
 when (i) the open button has been operated by the user and (ii) it is determined that the emergency situation has occurred, causing the door to open so that the user may exit the vehicle.

9. A method for controlling a door of a vehicle which is carried out by a door control device, the method comprising:
 determining whether or not an open button of the vehicle for opening the door has been operated by a user;
 determining, in response to determining that the open button has been operated by the user, whether or not an emergency situation has occurred in the vehicle based on predetermined conditions;
 when (i) the open button has been operated by the user, (ii) it is determined that the emergency situation has not occurred, and (iii) a signal output by a speed sensor of the vehicle indicates that the vehicle is stopped, causing the door to open so that the user may exit the vehicle; and
 when (i) the open button has been operated by the user and (ii) it is determined that the emergency situation has occurred, causing the door to open so that the user may exit the vehicle.

* * * * *